United States Patent
Hilton, Jr. et al.

(10) Patent No.: US 6,893,570 B1
(45) Date of Patent: May 17, 2005

(54) METAL REMOVAL PROCESS

(76) Inventors: Gene T. Hilton, Jr., Rt. 2, Box 294B, Lewisburg, WV (US) 24901; Timothy P. Danehy, 3016 Unionville Rd., Cranberry Township, PA (US) 16066; Margaret Hensley Dunn, 3016 Unionville Rd., Cranberry Township, PA (US) 16066; Clifford F. Denholm, IV, 3016 Unionville Rd., Cranberry Township, PA (US) 16066; Shaun L. Busler, 3016 Unionville Rd., Cranberry Township, PA (US) 16066

( * ) Notice: Subject to any disclaimer, the term of this patent is extended or adjusted under 35 U.S.C. 154(b) by 20 days.

(21) Appl. No.: 10/349,850

(22) Filed: Jan. 23, 2003

Related U.S. Application Data
(60) Provisional application No. 60/350,921, filed on Jan. 23, 2002.

(51) Int. Cl.[7] .................................................. C02F 1/62
(52) U.S. Cl. ........................ 210/667; 210/670; 210/688; 210/710; 210/714; 210/747; 210/912; 405/41; 405/129.25
(58) Field of Search ............................... 210/665–667, 210/670, 688, 710, 714, 724, 747, 170, 912; 137/236.1; 405/41, 87, 129.25

(56) References Cited

U.S. PATENT DOCUMENTS

| | | | |
|---|---|---|---|
| 1,171,046 A | | 2/1916 | Heckman |
| 4,377,483 A | | 3/1983 | Yamashita et al. |
| 4,705,638 A | | 11/1987 | Ganczarczyk |
| 4,857,203 A | | 8/1989 | Pope et al. |
| 5,863,422 A | * | 1/1999 | Watten .......................... 210/150 |
| 6,325,923 B1 | * | 12/2001 | Zaluski et al. ............... 210/150 |
| 6,582,156 B1 | * | 6/2003 | Flowers ......................... 405/41 |
| 6,602,421 B2 | * | 8/2003 | Smith ........................... 210/662 |
| 2001/0054588 A1 | | 12/2001 | Smith |

OTHER PUBLICATIONS

Kepler D.A. and McCleary E.C., Successive Alkalinity–Producing Systems (SAPS) for the Treatment of Acidic Mine Drainage. Presented at the Treatment of Acidic Mine Drainage. Presented at the International Land Reclamation and Mine Drainage Conference and the Third International Conference on the Abatement of Acidic Drainage, Pittsburgh, PA, Apr. 24–29, 1994.

Ziemkiewicz, P., and Skousen, J., The Use of Steel Slag in Acid Mine Drainage Treatment and Control. Twentieth West Virginia Surface Mine Drainage Task Force Symposium, Morgantown, WV, 1998.

(Continued)

*Primary Examiner*—Peter A. Hruskoci

(57) ABSTRACT

The slag-only Vertical Flow Pond, which we have developed, is a passive treatment component capable of removing large concentrations of metals, especially manganese, from water to extremely low concentrations while neutralizing acidity and producing alkalinity. An improvement to this design is the Hybrid Flow Pond (HFP), which is a passive treatment system component that consists of an open, pond-like structure utilizing a horizontal operational flow path (or a vertical flow path if desired) with a vertical flush flow path. By creating flushing flow paths generally perpendicular to operational flow paths, the development of preferential flow paths that encourage short circuiting can be prevented. Additional head can be generated prior to flushing by adjusting the water level in the pond. Although any treatment media can be used with this system, the use of basic steel slag is particularly useful in the removal of metals, especially manganese from aqueous solutions. These metals are either retained within the pond or flushed from the pond into a separate pond to accumulate in order to recover them at a later point in time.

19 Claims, 7 Drawing Sheets

OTHER PUBLICATIONS

Cravotta, Charles, A. III, "Oxic Limestone Drains for Treatment of Dilute, Acidic, Mine Drainage", Presented at the West Virginia Surface Mine Drainage Task Force Annual Symposium, Morgantown, WV, Apr. 7–8, 1998.

Skovran G.A. and Clouser C.R., Design Considerations And Construction Techniques For Successive Alkalinity Producing Systems. Presented at the 1998 Annual Meeting of the American Society for Surface Mining and Reclamation, St. Louis, Missouri, May 16–21, 1998.

Darcy Peart and Charles Cooper, P.E.. P.L.S., Preliminary Investigation Of Influent Distribution In A Vertical Flow System. Jennings Water Quality Improvement Coalition, Jul., 1999.

William W. Hellier, P.E., An Integrated Design Model For Passive Treatment Systems To Abate Water Pollution From Post–Mining Discharges. 1999 or 2000.

Simmons, J., Ziemkiewicz, P., Black, D.C., Use of Steel Slag Leach Beds for the Treatment of Acid Mine Drainage. 2001 National Assocation of Abandoned Mine Lands Annual Conference, Athens, OH, Aug. 19–22, 2001.

Watzlaf G.R., Schroeder, K.T., Kleinmann R.L.P., and Kairies C.L., The Passive Treatment Of Coal Mine Drainage. Presented at the 2002 annual meeting of the American Society of Mining and Reclamation, Lexington, Kentucky, Jun. 9, 2002.

Rose A.W. and Dietz J.M., Case Studies Of Passive Treatment Systems: Vertical Flow Systems. Presented at the 2002 National Meeting of the American Society of Mining and Reclamation, Lexington, KY, Jun. 9–13, 2002.

Simmons, J., Ziemkiewicz P. and Black D.C., Use Of Steel Slag Leach Beds For The Treatment Of Acid Mine Drainage: The McCarty Highwall Project. Presented at the 2002 National Meeting of the American Society of Mining and Reclamation, Lexington, KY, Jun. 9–13, 2002.

Danehy T.P., Hilton, T., Watzlaf, G.R., Johnson, F., Busler, S.L., Denholm, C.F., and Dunn M.H., 2002 Vertical Flow Pond Piping System Design Considerations. Presented at the 19th Annual National Meeting of the American Society for Suface Mining and Reclamation, Lexington, Kentucky, Jun. 9–13, 2002.

Gusek, J.J., "A New Millenium of Passive Treatment of Acid Rock Drainage: Advances in Design and Construction since 1988", Presented at the American Society of Mining and Reclamation Annual Conference, Lexington, KY, Jun. 9–13, 2002.

Kirby, Karl. Anoxic and Oxic Limestone Drains. http://www.facstaff.bucknell.edu/kirby/ALDOLD.html, Printout date Dec. 17, 2002, Publication date unknown.

* cited by examiner

METAL REMOVAL PROCESS

CROSS-REFERENCE TO RELATED APPLICATION

The benefit of provisional application No. 60/350,921 filed Jan. 23, 2002 is claimed. Provisional application No. 60/350,921 filed Jan. 23, 2002 is incorporated here by reference.

TECHNICAL FIELD

The present invention relates to a metal removal process, particularly the removal of metals from mine drainage.

BACKGROUND

Acidic metal-bearing aqueous discharges have been an environmental problem since mining first began. This problem is typically associated with abandoned coal mine operations; however, most mining activities have had some sort of water quality issue associated with them.

Up until approximately 20 years ago the only treatment option available to effectively handle these water quality issues were active treatment systems utilizing harsh chemicals and energy intensive machinery (i.e. pumps, agitators, aerators, presses, etc) which require constant attention and maintenance.

Within the last 20 years and primarily within the last 10 years, passive treatment systems utilizing environmentally friendly materials (usually limestone and compost) in a series of ponds, beds, and wetlands, requiring no electricity and little maintenance have been developed.

However, passive systems have historically (if 20 years can be called historical) not been dependable in meeting federal and state regulatory effluent limits to which mining companies are required to conform. In addition, these systems, with the exception of a few, have not been able to remove manganese and those that are removing manganese are not capable of reducing high concentrations to very low concentrations.

DISCLOSURE OF INVENTION

It is an object of the invention to provide a passive treatment system and process that removes metals, especially manganese from mine drainage. Besides being useful for treating drainage from abandoned mines, this could potentially assist active mining companies, quarry operators, manufacturers whose operations lead to water bearing dissolved metals, etc., as environmental regulations become increasingly more stringent. It would also be valuable to watershed groups, non-profits, state agencies, or any organization involved in abandoned mine reclamation. Currently, no such system exists, to our knowledge, that is capable of passively removing large quantities of manganese.

Another object of the invention is to provide measures such that the manganese can be recovered and sold.

These objects, as well as other objects which will become apparent from the discussions herein, are achieved by placing coarse, basic steel slag within a pond structure preferably in two tiers with accompanying piping system for vertical flow to be used as a passive system component in the treatment of metal-bearing water. When used to treat waters with large concentrations of metals, the slag should be of a size greater than ⅛ inch, with a preferable range of 1 to 6 inches, although any size aggregate that provides for effective treatment without resulting in a significant loss in permeability can be utilized. Permeability is intended to mean the ability of the treatment media to transmit or allow water or some other aqueous solution to travel through it.

The system is especially valuable in the passive treatment of acidic, aqueous discharges with high manganese concentrations. Manganese has historically been difficult to treat passively due to the high pH requirement (pH around 9) required for the manganese to change from a dissolved state to a solid state where it will settle out of solution.

Typically passive treatment systems utilize limestone to generate alkalinity and raise pH. Because bicarbonate alkalinity is formed, no limestone passive treatment system known to date can generate a pH high enough to cause the manganese to chemically precipitate out of solution. There has been some success from passive treatment systems that are treating manganese to some degree (probably through microbial reactions). These systems are not known to consistently remove manganese to acceptable limits, especially in situations with high concentrations of manganese and during colder weather. Basic steel slag on the other hand can increase pH values to levels greater than the pH needed to chemically precipitate manganese. However, precautions must be taken because slag has been documented to increase pH values in excess of 12 with alkalinity values greater than 1000 mg/l reported as $CaCO_3$. Water of this quality will not meet effluent limits and cannot be discharged into natural streams.

A larger size basic steel slag is used primarily for two reasons. First, the larger size allows for larger voids to inhibit plugging of the system. If a small(<⅛ in) size was used to directly treat metal-bearing mine drainage, the system could potentially plug after only a short period of time. Second, the larger size has less surface area resulting in lower pH values and lower alkalinity values. When sized to allow for proper retention time, a slag-containing vertical flow pond will generate a lower pH, but one that is still greater than the 8.8 pH needed to precipitate the manganese and an alkalinity value of about 30–300 mg/L. The lower alkalinity value allows the pH of the effluent water to decrease much more quickly to meet effluent limitations, which is easily obtained in a subsequent settling pond and/or wetland complex. Preferably, a pond of the invention uses slag as the only treatment media.

Advantageously, a pond of the invention utilizes a flushable two-tiered piping system that allows for maximum water distribution throughout the pond and, selectively, the flushing of metal precipitates out of the pond; however, a multi-tiered piping system consisting of more than two tiers is also feasible, but may not typically be needed or desired depending upon site conditions, water quality, and costs. During flushing (gravity and/or backflushing), the effluent can be collected, for instance in a separate pond, for recovery of the precipitates as a source of manganese and other valuable components.

Although this slag vertical flow pond has shown to be effective, an improved design, the Hybrid Flow Pond (HFP) has been developed. This improved design allows for the passive treatment of aqueous solutions with (depending upon the water quality of the influent and the desired effluent water quality) limestone, slag, marble, organic and inorganic and/or a mixture and/or layered configuration of one or more than one of the said materials as a treatment media utilizing a unique piping system in an unburied, open pond-like structure that gives the system increased flexibility in its mode of operation. This system has the ability to operate utilizing either horizontal or vertical flow during normal operation and to flush utilizing vertical flow where the head can be readily adjusted by manipulating the water level in the pond. This allows the system to generate flow paths during a flush event that are generally perpendicular to normal operational flow paths.

Aiding in the above or independently useful are adjustable risers for regulating flow. For instance, the risers may be used to adjust the overall liquid level, or they may be used to chang the pressure heads experienced by separate cells within beds of treatment medium or media.

MODES OF THE INVENTION

A benefit of passive systems is that they can be custom designed based upon site conditions. Information such as water quality data, flow measurements, topography, and general site characteristics is obtained before design begins. Using this information, sizing of the system is determined. Ponds are then constructed to meet the size design.

Figure 1:
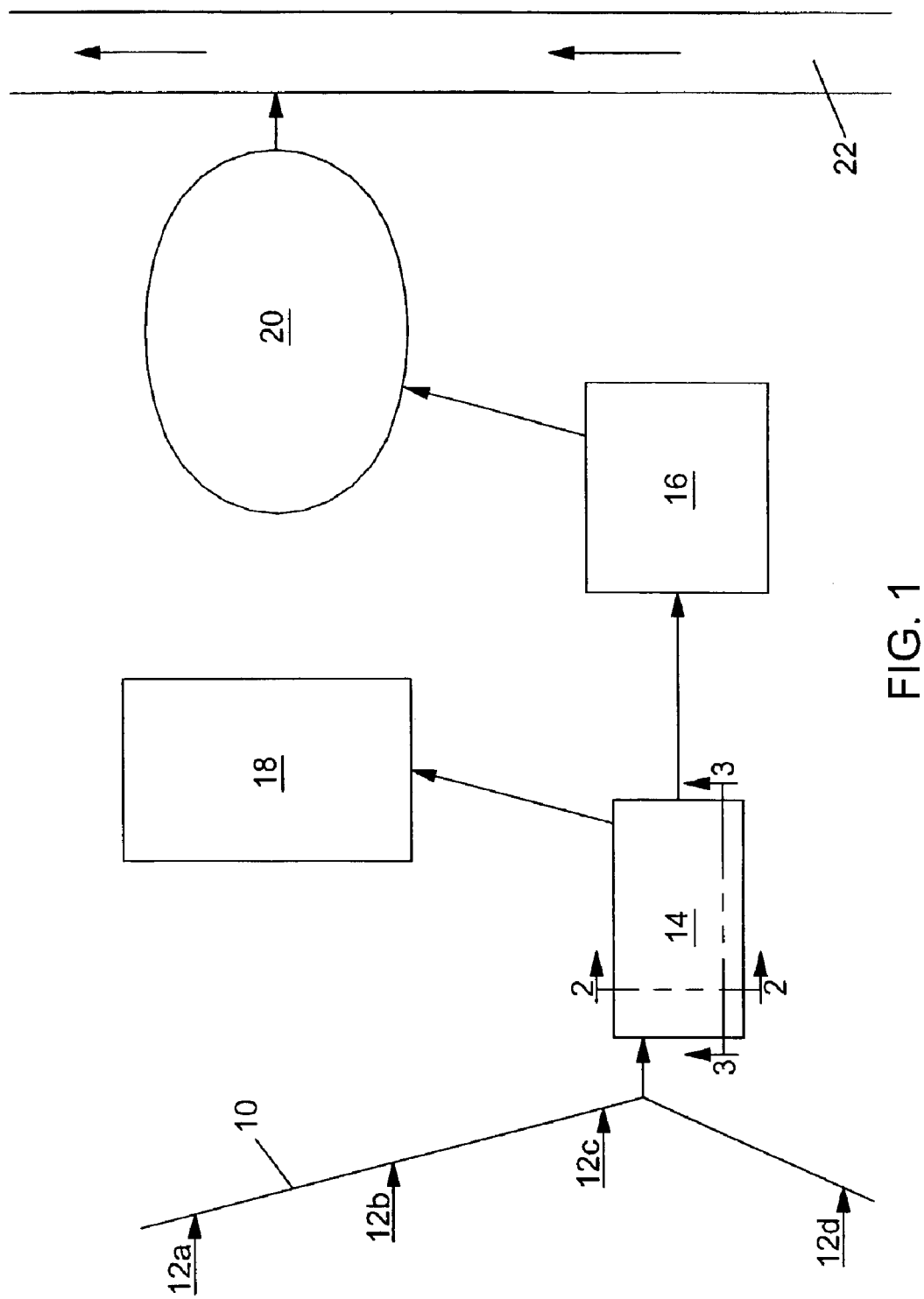
FIG. 1 is a map of an installation for treatment according to the invention.

FIG. 1 maps an example of a treatment site built according to the invention. Channel system 10 collects acidic mine seepages 12a,b,c,d and feeds the collected metal-bearing water into a Vertical Flow Pond (VFP) 14 of the invention. Slag is the only treatment media used in this particular VFP 14. The VFP 14 discharges into settling pond 16, or into flush pond 18, depending on the mode of operation of the VFP 14. Discharge from the settling pond is into a wetland 20. The wetland outlets into stream 22.

Figure 3:
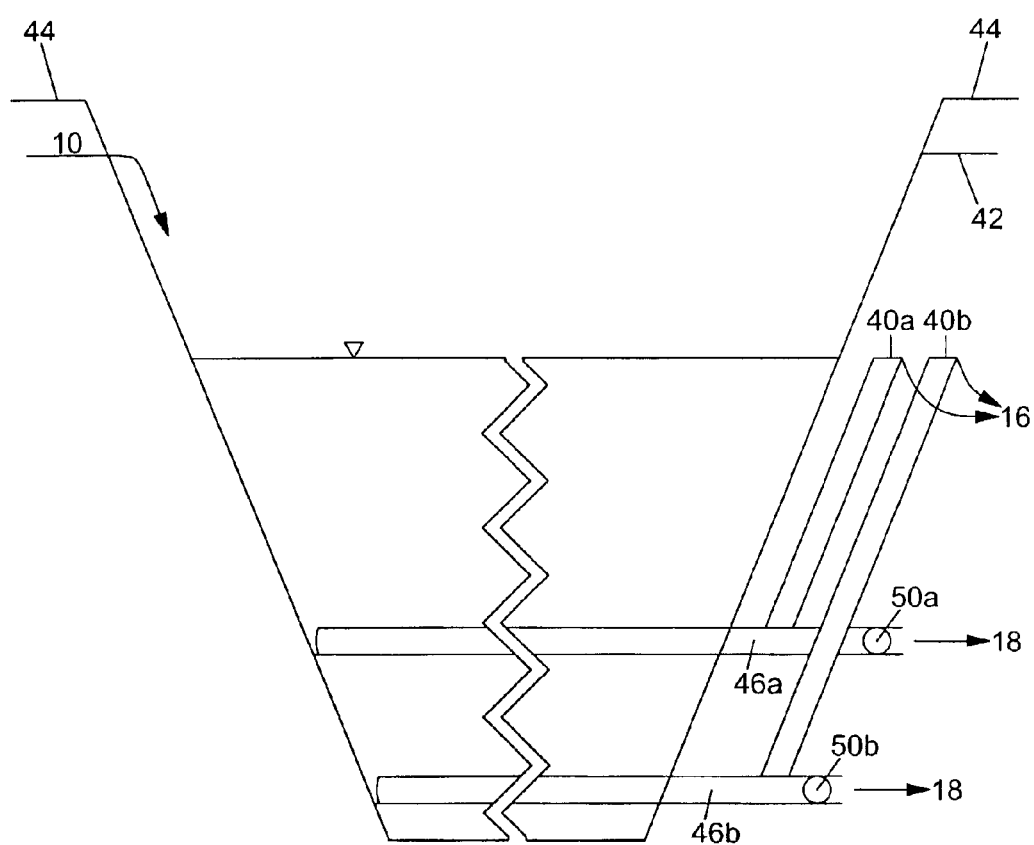
FIG. 3 is a cross-sectional view of the pond of FIG. 2 taken on the cutting plane 3—3 of FIG. 1, with the central portion broken away and treatment media and aggregate removed.
Figure 4:
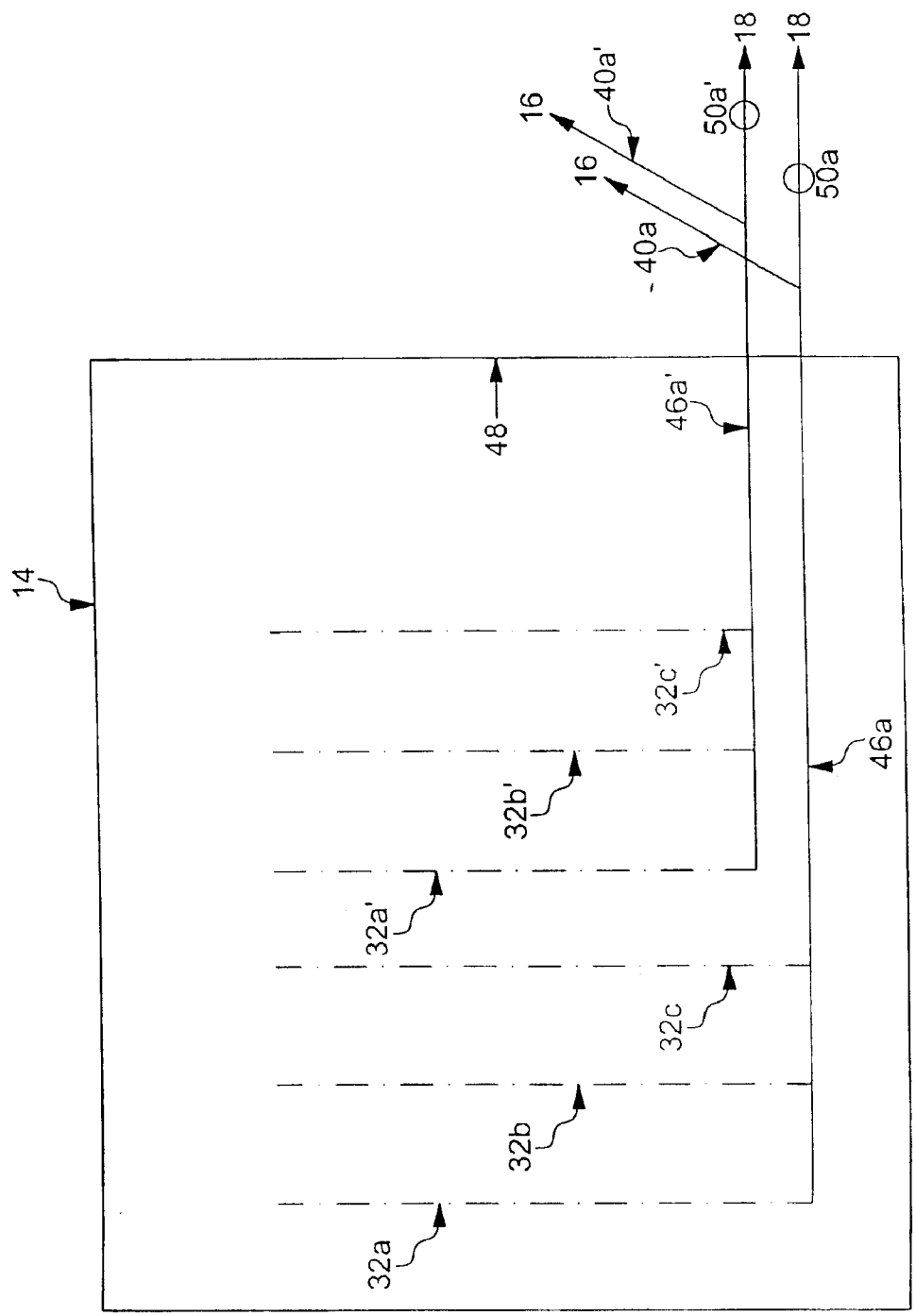
FIG. 4 is a top view of the pond of FIGS. 2 and 3, with water, treatment media and breastwork removed, in order to show a detail of the internal construction of the pond.
Figure 5:
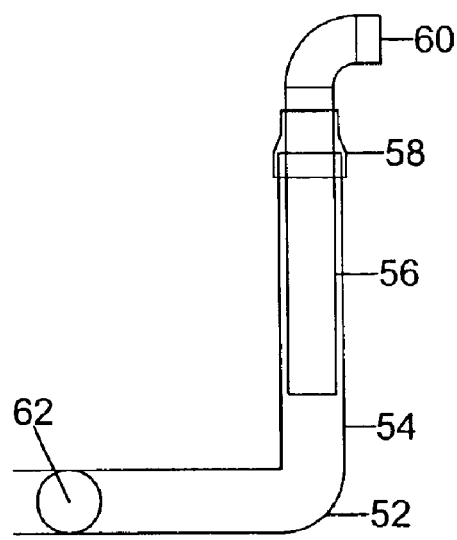
FIG. 5 is a typical view of the adjustable outlet riser and optional control valve.

An example of VFP 14, one of the main focuses of this invention, is shown in FIGS. 2–5. As detailed in FIG. 2, VFP 14 receives a geotextile lining 24 on the pond bottom and up to at least the top elevation of the treatment media. A 0.5° layer of AASHTO #57 aggregate 26 is placed on the geotextile on the bottom of the pond. Next comes the lower tier underdrain 28, followed by the spreading of the first 21 layer 30 of treatment media, then the upper tier underdrain 32, then the spreading of the second 21 layer 34 of treatment media. This is followed by the finishing of remaining outlet/inlet control structures. The pond is designed to have a water cap 36, (whose upper level is indicated by the small triangle in the drawing) and additional water storage depth 38. The water cap provides a minimum pressure head to assist with flushing events. If additional head is necessary, outlet risers (as seen in FIG. 5 and discussed below) may be adjusted to allow the water level in the pond to increase prior to a flushing event. Emergency spillways 42 (FIG. 3) are installed to prevent breaching by providing a controlled outlet prior to the water level reaching the top of the berm 44.

Referring particularly to FIGS. 3 and 4, the underdrain/flush system consists of two tiers. Each tier is divided into separate cells within the pond. The cells are not separated from one another physically by diaphragms for instance; instead, the cells are determined by having separate underdrain/flush pipes assigned to them. The number of cells can vary depending upon the size of the pond and other design considerations.

Figure 6:
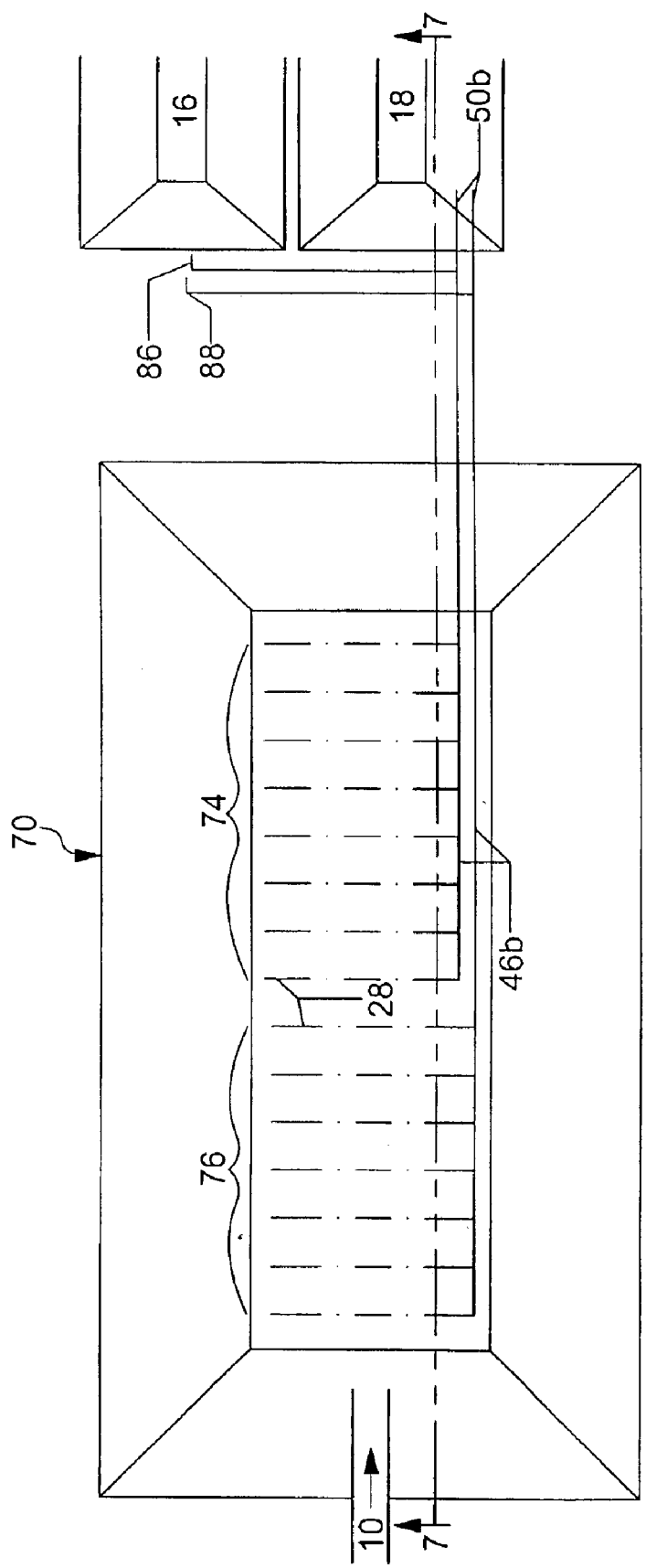
FIG. 6 is a plan view of the Hybrid Flow Pond (HFP). Only the bottom tier of the piping system is shown for simplicity.

FIG. 4 shows an example of the piping of a cell. Each cell has a set of perforated lateral pipes (laterals) 32a,b,c, . . . , which are collectively referenced as underdrain 32 and/or 28 in FIGS. 2,3 and 6. The laterals connect to an unperforated individual header 46a and 46b (FIG. 3), which extends along the length of the pond, through the breastwork 48, and terminates at a flush valve 50a or 50b depending upon which tier. Prior to reaching the flush valve, an outlet riser 40a is installed. The discharge elevation of an outlet riser, e.g. riser 40a, may be adjustable. For example, the adjustable outlet riser (FIG. 5) consisting of an elbow 52, a riser 54, an adjustable riser 56, a reducer 58, an elbow 60, and an optional control valve 62 allows for individual monitoring of each cell and manipulation of flow through each cell of treatment media to maximize treatment efficacy, system utilization and water level manipulation. Riser 56 has a tight but slidable fit with reducer 58, so that the level of elbow 60 can be adjusted without leakage at the location of the fit. The fit can be provided by a rubber collar, for example.

The adjustable riser in itself is a unique invention. To our knowledge, nothing else like it exists. Typical passive treatment systems that include adjustable water level control devices utilize inline water level control devices that are used in ponds, which use multiple stoplogs to control water elevations. These stoplogs are added or removed within the structure to raise or lower water levels within a pond. Water levels can only be adjusted by set increments, rather than continuously. In a typical system using the inline device, only one per pond is used. An advantage of the adjustable riser is that not only does it give more accurate control of water elevations within the pond, but it also allows for each riser to be individually adjusted to control flows within their respective cells. An additional advantage of the adjustable riser is that it is easily adjusted with hand tools, unlike any of the other water control devices and is not limited to any set increments.

A "cell" can best be defined by imagining the pond divided in half horizontally into two tiers (the upper and lower). Each tier is then effectively divided into sections by the result of the piping system. These sections are the "cells". In addition the tiers are also effectively divided by the piping system. Although the number of laterals can vary, a group of laterals in a particular tier will generally have its own header pipe. This section of the pond is a "cell". The number of cells within a pond will depend upon the size of the pond and other design considerations. Ponds constructed with this design to date have had as few as four cells (two in top tier and two in bottom tier) and as many as 12 (six in top tier and six in bottom tier) although the design is quite flexible so as to be easily modified to include as many cells as desired.

As an example, in FIG. 4, laterals 32a,b,c . . . , connect to header 46a. Although there may and generally are more laterals connected to a header, all of the laterals that are connected to this particular header make up just one cell. Next to that cell would be another set of laterals that for clarity will be referred to as 32a',b', c' . . . , which would connect to header 46a' which extends along the length of the pond, through the breastwork 48, and terminates at flush valve 50a'. Prior to reaching the flush valve, an outlet riser 40a' is installed. FIG. 4 only illustrates two cells of the upper tier for clarity. Depending upon the needs of the system, as many cells as desired can be included in each tier.

The spacings of the laterals and perforations are designed to achieve: 1) Effective flow distribution during normal operation through the risers and 2) Effective purging of metal precipitates through the flush valves during flushing events.

In an example, the laterals are spaced 4.5° on center with two, ½-inch perforations drilled 30-degrees from the top of the pipe every 4.5°.

Tables I and II give for pond 14 for this example the influent through line 10 and the effluent into pond 16 over the course of 350 days. As can be seen from this data, the dissolved manganese concentrations in the effluent of pond 16 are essentially zero regardless of the influent concentrations. In addition concentrations of dissolved iron and aluminum are also decreased while alkalinity and pH values are increased significantly. The slag used in pond 14 had a particle size range of 1×4 inches and was basic steel slag from Weirton, W.Va., as processed by International Mill Service of Horsham, Pa.

Flow distribution: The numerous perforations in the laterals throughout the slag-only VFP system allows the water being treated to travel at a very low velocity during normal operation. Spacing at 4.5' centers of the relatively small perforations is designed to encourage the flow to maximize the volume of treatment media utilized. This helps to increase treatment efficiency through higher effective retention time.

Treatment Mechanism: When the water to be treated enters the slag-only VFP it comes into contact with the treatment media, which is basic steel slag. Composition of the slag includes CaO, which upon dissolution produces an hydroxide alkalinity, which can raise the pH value much higher than the bicarbonate alkalinity produced by limestone. Product solubility is dependant upon pH. Once the pH value reaches a value of about 9, manganese will precipitate within the treatment media. While chemical precipitation is the principal mechanism for metal removal, it is intended that removal refers to any other mechanism, which may be operating within the treatment media, such as co-precipitation, absorption, autocatalysis, etc.

Flushing of metal precipitates: In order to remove these precipitates, the underdrain system is designed to provide a flushing mechanism. The design encourages increased velocity at each perforation during flushing events. The higher velocity is intended to increase the amount of "pull" that each perforation has, thus more effectively purging the treatment media. The use of individual cells decreases the total surface area to be flushed in order to increase velocity while using two tiers decreases the vertical distance the metal precipitates are required to travel prior to elimination from the treatment media. Flushing may be of short duration or may be of sufficient time to drain the entire pond 14. Backflushing may also be used to remove additional solids. The discharge during these flushing events goes to flush pond 18 (rather than the settling pond 16 used for normal operation) for dewatering and accumulation of metal-bearing solids to be recovered and processed at a later date.

An example of how backflushing may be conducted is as follows: Insure flush valves 50a and/or 50b are closed. Remove adjustable riser 56 from riser 54 for the primary 86 and/or secondary 88 cells for either the upper tier underdrain 32 and/or lower tier underdrain 28. Attach discharge end of pump to risers 54. Agitate treatment media 30 and 34 by pumping liquid or gas. Shut pump off and open flush valves 50a and 50b. The backflushing may occur in one or more cells at a time.

Advantages: There are several advantages when using the slag only VFP 14 to treat mine related discharges. First, its use will allow for the removal of manganese from polluted water utilizing passive treatment technology that does not require the use of harsh chemicals, electricity, or constant attention and maintenance. This means that these systems can be placed in isolated locations where there is no electricity and no one on hand to constantly monitor the system. Second, because of the size of the basic steel slag that is used, the pH can be raised to a value greater than around 9 for chemical precipitation, but generates low enough alkalinity values so that the pH level can stay within, or can quickly recover to meet, regulatory effluent limits. Third, basic steel slag possesses a chemical composition that can generate greater alkalinity values and higher pH values with shorter contact time than limestone; therefore, the retention time can be decreased and thus the size of the structure can also be decreased. This is very significant because space is almost always a critical limiting factor in the design of passive treatment systems. Mine drainage often issues in discharge zones, which are typically in close proximity to streams, which limits the amount of available space and elevation change needed to construct a passive treatment system. The more a system component can accomplish in the least amount of space, the more useful and effective that component can be. Fourthly, slag is typically abundant in regions affected by mine drainage, because it is more economically viable for steel production facilities to be located in the same region as the raw materials (coal) due to shipping costs. A fifth advantage of using a slag system is that a waste product from a manufacturing process is being turned into a useful resource treating an environmental problem while not having to utilize a non-renewable valuable natural resource such as limestone.

Improvement: The Hybrid Flow Pond (HFP)

Figure 7:
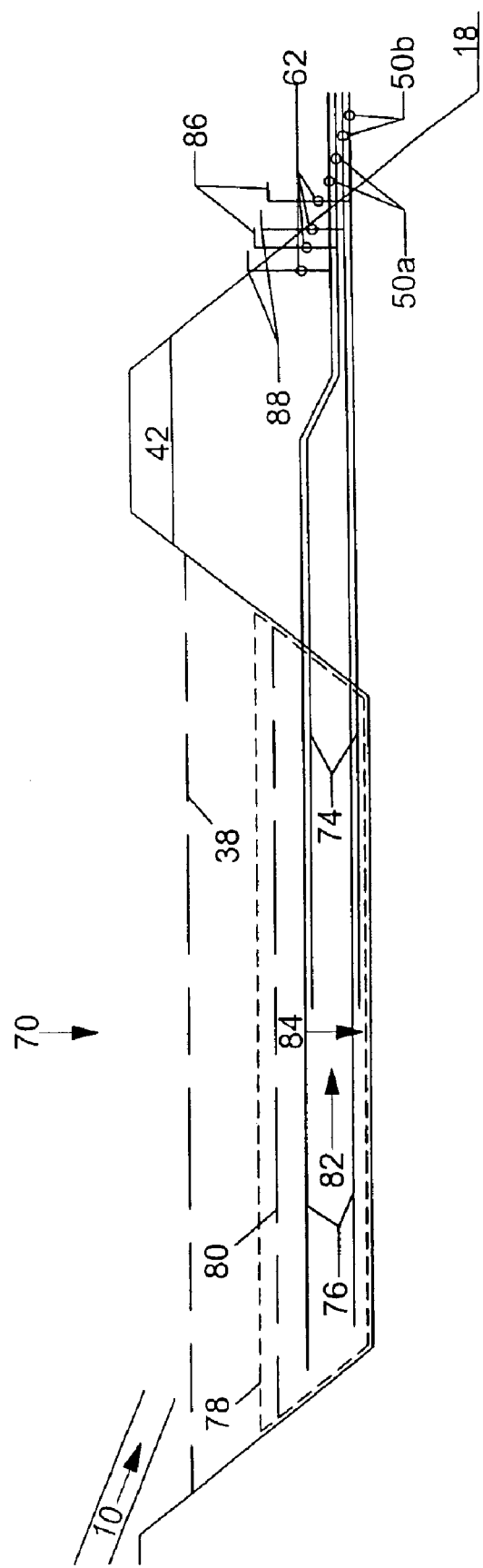
FIG. 7 is a cross-sectional view of FIG. 6 taken on the cutting plane 7—7 of FIG. 6 which details the piping system that comprises the Hybrid Flow Pond (HFP) component of the system.

An improvement to the original design of the slag only vertical flow pond (VFP)14 system has been made. A new component, the Hybrid Flow Pond (HFP)70 shown in FIGS. 6 and 7, has been developed and can easily substitute for the VFP 14. Unique to this system is the ability to operate the passive component utilizing horizontal flow 82 or vertical flow 84 and to flush utilizing vertical flow 84 where the head can be readily adjusted by manipulating the water level in the pond. This allows the system to generate flow paths during a flush event that are generally perpendicular to normal operational horizontal flow paths.

Depending upon influent water quality and desired effluent water quality, limestone, slag, marble, organic, and inorganic and/or a mixture and/or layered configuration of treatment medium/media 78 could be used with the piping system rather than the slag-only media of pond 14. Generally this piping system will be installed in an open pond-like structure within the treatment medium/media 78 as already detailed above for VFP.

Figure 2:
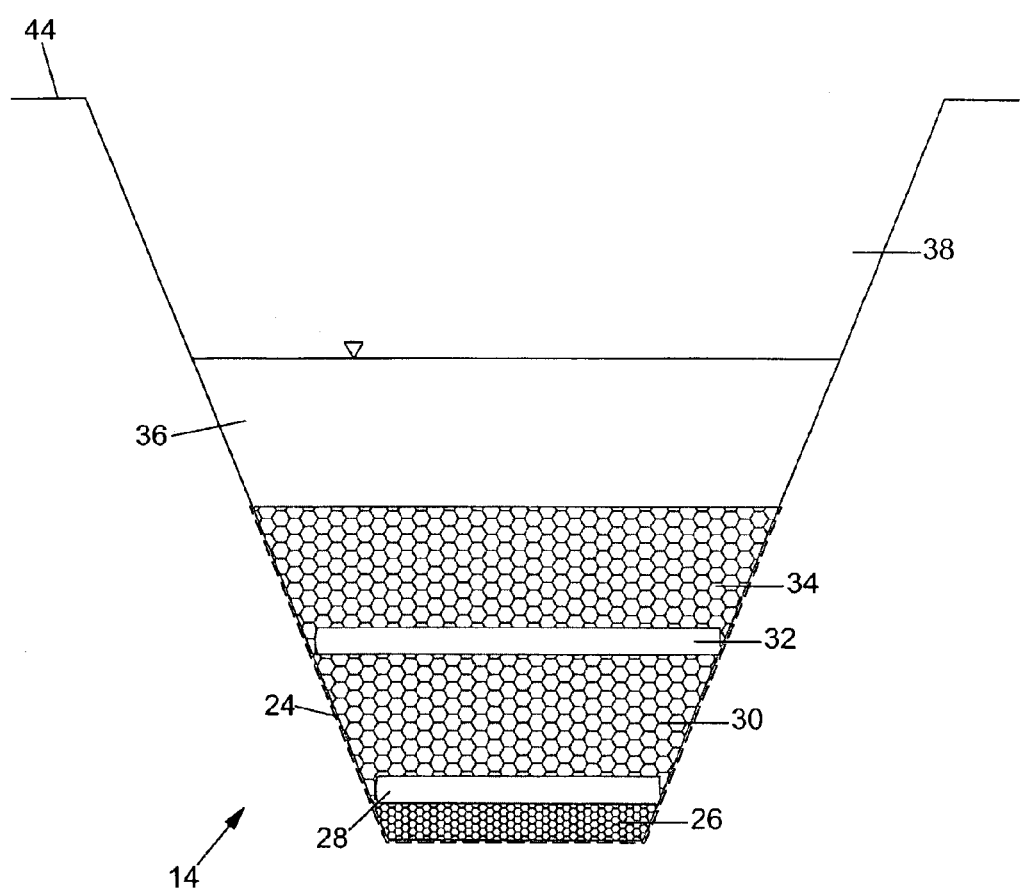
FIG. 2 is a cross-sectional view of a pond taken on the cutting plane 2—2 of FIG. 1.

The pond 70 is designed to eliminate the need of water cap 36 (whose upper level is indicated by the small triangle in the drawing FIG. 2 and FIG. 3) and additional water storage depth 38 during normal operation; however, water depth can be adjusted to a level above the treatment medium/media 78 in the water storage area 38, which will temporarily provide additional head pressure to assist with flushing events or to establish a water cap 36 if desired. If additional head is necessary, outlet risers or optional control valves (as seen in FIG. 5 and discussed earlier) may be adjusted to allow the water level in the pond to increase prior to a flushing event.

A unique idea of the Hybrid Flow Pond 70 requires that the outlet risers be adjustable to maintain a water level 80 that can be adjusted from a point approximately one foot below the top of treatment medium/media 78 (no water cap), to a level above the medium/media 78 that will allow a water cap to develop. The first HFP 70 was developed by retrofitting an existing vertical flow pond 14. This was accomplished by installing an elbow and adjustable riser at the end of the flush pipes after the flush valve. This allowed the operational water level 80 to be maintained below the top of the treatment medium/media 78. Maintaining level 80 below the top of treatment medium/media 78 during normal operation is preferred because it prevents the water from short circuiting and not receiving treatment that may occur if the water level is above the treatment medium/media 78 by traveling across the structure without ever contacting the medium/media 78. However, for a passive system that is specifically and initially designed as an HFP 70, the design would allow for adjustable riser installation prior to the flush valve (FIG. 5), in order to achieve level 80 for normal operation and have the ability to adjust the water to level 38 for flushing.

In addition to flow distribution, the HFP 70 incorporates a cell layout that allows the flow to be collected at an end of the pond that is opposite from the influent source 10. During normal operation, the water passes through the treatment medium/media 78 and is collected by the primary cell(s)74 of the underdrain and subsequently discharged to the settling pond 16 via the primary spillways 86. This allows the water to enter the treatment medium/media 78 and flow horizontally through to maximize treatment through increased effective retention time through the medium/media 78. During flushing events (gravity and/or backflushing), the water will move vertically through the treatment medium/media 78, enter both the primary 74 and secondary cells 76 and be discharged to the flush pond 18 by opening flush valves 50a and 50b. The secondary spillways 88, are provided to allow for system flexibility, monitoring and backflushing.

The HFP 70 is unique in that it develops a vertical flushing flow path 84 that is generally perpendicular to the normal horizontal operational flow path 82. This prevents the formation of preferential flow paths that can develop when flush and operational flow paths are parallel.

Advantages. Although both the VFP 14 and the HFP 70 are effective, there are several additional advantages when using the HFP 70 as a substitute for the slag only VFP 14 to treat mine related discharges. First, the Hybrid Flow Pond 70 increases the effective retention (i.e. contact) time within the treatment medium/media 78 resulting in a better quality effluent. A second advantage of the HFP 70 is that its design increases flushing efficacy for system maintenance and metals recovery. A third advantage of the HFP 70 is that it increases flexibility to allow operation as a vertical flow or horizontal flow pond depending on water quality/quantity, dynamic site conditions, etc. A fourth advantage of the Hybrid Flow Pond 70 is that it assists in preventing development of preferential flow paths that encourage short-circuiting with subsequent loss of effective retention time. A fifth advantage of the Hybrid Flow Pond 70 is that any effective treatment media 78 can be used within the system to treat water.

There follows, now, the claims. It is to be understood that the above are merely preferred modes of carrying-out the invention and that various changes and alterations can be made without departing from the spirit and broader aspects of the invention as defined by the claims set forth below and by the range of equivalency allowed by law.

What is claimed is:

1. A method for removing a metal dissolved in water from the water, comprising running the water through an open pond-like structure including a bed of basic steel slag to remove the metal from the water and flushing removed metal from the bed on generally vertical flow paths through the bed.

2. A method as claimed in claim 1, wherein the slag particle size is greater than ⅛ inch.

3. A method as claimed in claim 1, wherein the slag is about in the size range 1 to 6 inches.

4. A method as claimed in claim 1, wherein the metal is manganese.

5. A method as claimed in claim 1, wherein a plurality of metals are removed in the bed.

6. A method as claimed in claim 1, further comprising collecting removed metal effluent from the flushing and recovering precipitates from the effluent.

7. A method as claimed in claim 1 wherein the metal comprises manganese and further comprising collecting effluent from the flushing and recovering precipitates from the effluent as a source of manganese.

8. A method as claimed in claim 1 wherein the step of flushing removed metal includes a step of backflushing by pumping liquid or gas through a multi-tiered piping system.

9. A method as claimed in claim 1 wherein the pond-like structure includes an adjustable outlet riser.

10. A method of operating an open pond-like structure for removal of at least one metal from mine drainage or other metal-contaminated aqueous solutions in a bed of medium or media, wherein an improvement comprises the steps of flowing solution generally horizontally through the bed to remove metal from a metal-contaminated aqueous solution and flushing removed metal from the bed on generally vertical flow paths through the bed.

11. A method as claimed in claim 10, wherein the improvement further comprises maintaining solution level within the bed during the step of flowing.

12. A method as claimed in claim 11 wherein the improvement further comprises causing solution to rise above the bed preliminary to the step of flushing.

13. A method as claimed in claim 12, wherein the improvement further comprises accomplishing the step of causing by adjusting an adjustable riser.

14. A method as claimed in claim 10 wherein said structure has an interior and a piping system dividing the interior into cells, said piping system including a separate header for each said cells, each header having its own riser whose output level can be raised or lowered.

15. A method as claimed in claim 10 wherein said structure is divided into a plurality of cells each including a header comprising an adjustable outlet riser comprising a riser (54), a reducer (58) sealed to the riser (54), and an adjustable riser (56) having a tight but adjustable fit with the reducer.

16. A method as claimed in claim 10 wherein the medium comprises basic steel slag having a particle size in the range of about 1 to 6 inches.

17. A method as claimed in claim 10 wherein the treatment medium or media is selected from the group consisting of inorganic materials, organic materials, and mixtures thereof.

18. A method as claimed in claim 10 wherein the treatment medium or media comprises limestone, marble, basic steel slag, blast furnace slag, or other types of slag.

19. A method as claimed in claim 10 wherein the treatment medium or media is provided in layered configurations.

* * * * *